Dec. 1, 1925.  1,564,186
C. W. SPICER ET AL
FLEXIBLE COUPLING
Filed July 16, 1924
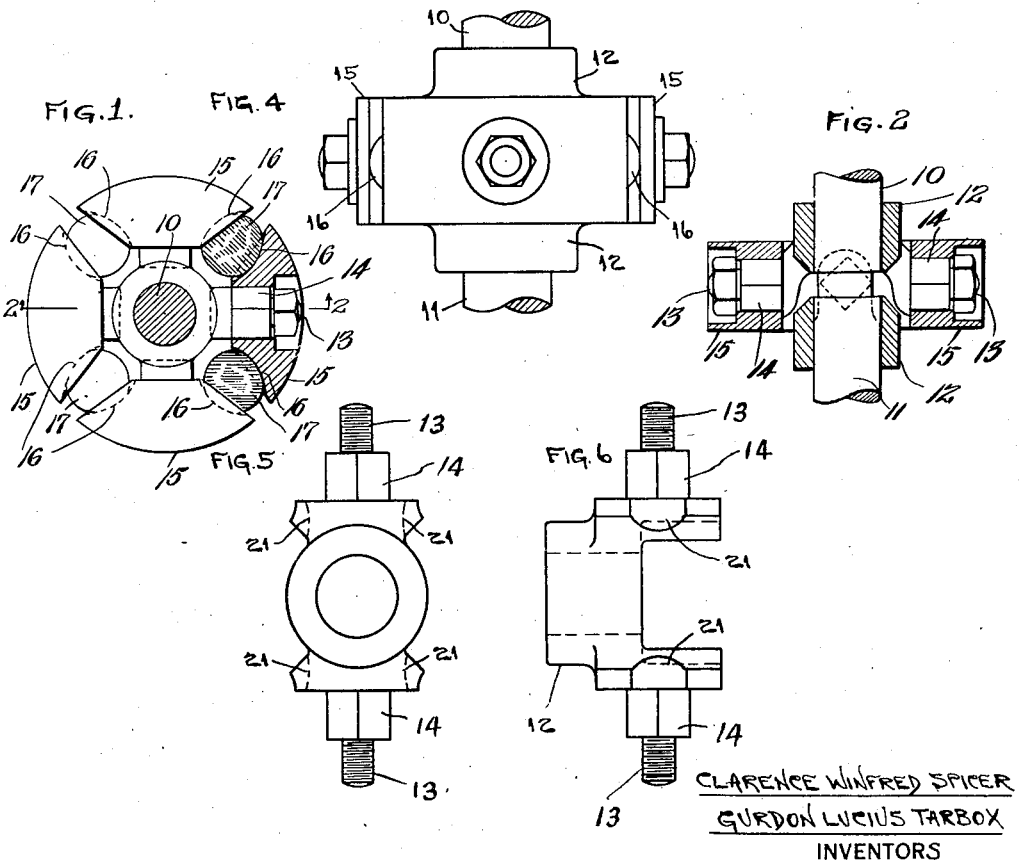
CLARENCE WINFRED SPICER
GURDON LUCIUS TARBOX
INVENTORS
BY
(THEIR) ATTORNEY Patented Dec. 1, 1925.

1,564,186

UNITED STATES PATENT OFFICE.

CLARENCE WINFRED SPICER AND GURDON LUCIUS TARBOX, OF PLAINFIELD, NEW JERSEY, ASSIGNORS TO SPICER MANUFACTURING CORPORATION, A CORPORATION OF VIRGINIA.

FLEXIBLE COUPLING.

Application filed July 16, 1924. Serial No. 726,358.

*To all whom it may concern:*

Be it known that we, CLARENCE WINFRED SPICER and GURDON LUCIUS TARBOX, both citizens of the United States, residing in Plainfield, in the county of Union, State of New Jersey, have invented certain new and useful Improvements in Flexible Couplings, of which the following is a disclosure.

Our invention relates to flexible couplings such as are employed to connect rotatable power shafts of all kinds, and particularly to couplings for connecting the power shafts of automobiles, and is an improvement on flexible couplings described in U. S. Patents #1,425,616 and #1,443,440 granted to us.

The object of this invention is to produce a joint that is simple and compact in construction and one that can be easily assembled.

A further object of our invention is to provide a joint with simple means of compressing the resilient members.

The foregoing and other features of our invention will now be described in connection with the accompanying drawings forming part of this disclosure in which we have represented our flexible coupling in its preferred form, after which we shall point out more particularly in the claims those features which we believe to be new and of our own invention.

In the drawings accompanying and forming part of this specification:

Figure 1 illustrates an embodiment of our invention in part section—at right angles to the shafts to be connected.

Figure 2 is a section along the lines 2—2 Figure 1.

Figure 3 illustrates a modified form—similar to that shown in Figure 1.

Figure 4 is a view at right angles to that shown in Figure 3.

Figures 5 and 6 are two views of the yokes employed in the modification shown in Figure 3.

Referring in detail to the structure illustrated in Figures 1 and 2—the reference numerals 10 and 11 designate the two shafts to be connected. On the end of each of these shafts are oppositely disposed hub members 12 carrying a plurality of projections 13 provided with square shank 14. Adapted to slide on these shanks are members 15 provided with bowl shaped cavities 16 whose diameter is larger than the balls 17. The balls are made of rubber, rubber compounds or other resilient material, and when disposed between the members 15 will function to flexibly connect the two parts of the coupling and will, owing to their flexibility and to their rolling action in the bowl shape cavities, permit the joint to operate at considerable angles.

These rubber balls are inserted and maintained under substantial compression and in order to facilitate assembly this form has been devised. On the end of the square shanks 14 means is provided such as a screw stud and nut by means of which the members 15 may be adjusted radially and thereby regulate the compression desirable on the balls.

It is perfectly obvious that the shanks 14 may be of other cross section than square so long as the members 15 may slide radially without any turning on the shanks.

Referring in detail to the structure illustrated in Figures 3, 4, 5 and 6 the hub members are so shaped that they project in under the ball and are provided with oval shaped cavities 21 so that the balls 17 roll in cavities 16 and 21.

With this improvement as illustrated and described in the two embodiments it is perfectly obvious that this flexible coupling is simple and convenient in assembly. The hub members are secured to the shafts in any suitable manner and the balls slipped over the shanks and the nuts are screwed down until the desired compression of the balls is had.

It is perfectly obvious that the bowl shaped cavities need not be spherical but may be of varying curvature to permit more freedom of movement in one direction than the other and the balls may be other than spherical for the same reason.

We wish it distinctly understood that our improvement in ball joints herein described and illustrated is in the form in which we desire to construct it and that changes or variations may be made as convenient or desirable without departing from the salient features of our invention and we therefore intend the following claims to cover such modifications as naturally fall within the lines of invention.

We claim:

1. A flexible shaft coupling comprising two oppositely disposed hub members carrying a plurality of projections, members carried by these projections provided with bowl shaped cavities, balls of rubber or similar material disposed in said cavities and operating to flexibly connect the two parts of the coupling, means to radially move the aforesaid members whereby the compression of the balls may be regulated.

2. A flexible coupling comprising driving and driven members having bowl shaped cavities therein, and resilient balls intermediate said members and acting under compression, said balls being seated in said cavities and having a normal curvature greater than the curvature of said cavities, means to vary the space between the cavities whereby the compression of the balls may be varied.

3. A flexible coupling comprising driving and driven members carrying a plurality of projections—members adapted to radially move on the aforesaid projections carrying bowl like cavities therein, resilient balls intermediate said members, said balls being seated in said cavities and having a normal curvature greater than the curvature of said cavities, means to reduce the space between the cavities thereby placing the balls under compression.

4. A flexible shaft coupling comprising two oppositely disposed hub members carrying a plurality of projections, each projection carrying a member provided with bowl shaped cavities, means to regulate the space between the oppositely disposed cavities.

5. A flexible shaft coupling comprising two oppositely disposed hub members carrying a plurality of radial projections, each projection carrying a member adapted to move radially thereon, bowl shaped cavities formed in both the hub members and the members adapted for radial adjustment, resilient balls seated in the cavities and operating to flexibly connect the members, the normal curvature of the balls being greater than the curvature of the bowl shaped cavities.

In witness whereof we have affixed our signatures.

CLARENCE WINFRED SPICER.
GURDON LUCIUS TARBOX.